(12) United States Patent
Curlier

(10) Patent No.: US 10,364,038 B2
(45) Date of Patent: Jul. 30, 2019

(54) PROPULSION UNIT FOR AN AIRCRAFT

(71) Applicant: SAFRAN AIRCRAFT ENGINES, Paris (FR)

(72) Inventor: Augustin Marc Michel Curlier, Boissise la Bertrand (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 130 days.

(21) Appl. No.: 15/285,117

(22) Filed: Oct. 4, 2016

(65) Prior Publication Data

US 2017/0096231 A1 Apr. 6, 2017

(30) Foreign Application Priority Data

Oct. 5, 2015 (FR) ...................... 15 59443

(51) Int. Cl.
| | | |
|---|---|---|
| B64D 35/04 | (2006.01) | |
| F02K 3/04 | (2006.01) | |
| F02C 7/36 | (2006.01) | |
| B64C 11/46 | (2006.01) | |
| B64D 27/10 | (2006.01) | |
| B64D 35/02 | (2006.01) | |
| F02C 3/00 | (2006.01) | |

(52) U.S. Cl.
CPC .............. *B64D 35/04* (2013.01); *B64C 11/46* (2013.01); *B64D 27/10* (2013.01); *B64D 35/02* (2013.01); *F02C 3/00* (2013.01); *F02C 7/36* (2013.01); *F02K 3/04* (2013.01); *F05D 2220/323* (2013.01); *F05D 2240/35* (2013.01); *F05D 2260/40* (2013.01); *Y10S 464/906* (2013.01)

(58) Field of Classification Search
CPC .... B64D 35/04; B64D 27/10; B64D 27/3502; F02C 3/00; F02C 7/36; B64C 11/46; F02K 3/04; F05D 2240/35; F05D 2240/323; F05D 2260/40; Y10S 464/906
USPC .............. 60/226.1, 805; 244/54, 55, 58, 60; 74/665 GB; 464/140
See application file for complete search history.

(56) References Cited

U.S. PATENT DOCUMENTS

| | | | |
|---|---|---|---|
| 1,916,442 A | 7/1933 | Rzeppa | |
| 2,875,599 A | 3/1959 | Gregory | |
| 3,485,462 A * | 12/1969 | Spence | .................. B64D 27/02 244/55 |
| 4,871,130 A | 10/1989 | Schulze | |
| 7,540,450 B2 * | 6/2009 | Brand | .................... B64D 27/14 244/54 |
| 8,118,683 B2 * | 2/2012 | Disser | .................... F16D 3/065 464/906 |
| 2008/0098719 A1 | 5/2008 | Addis | |
| 2016/0326964 A1 * | 11/2016 | Curlier | .................... F02K 3/072 |

(Continued)

OTHER PUBLICATIONS

GKN Catalog, GKN Automotive, Inc. 1993, 464/906 (Year: 1993).*

(Continued)

*Primary Examiner* — Greg Binda
(74) *Attorney, Agent, or Firm* — Christensen O'Connor Johnson Kindness PLLC

(57) ABSTRACT

Propulsion unit for an aircraft, comprising a turbine, at least one propeller offset with respect to the turbine, and a power transmission disposed between the turbine and the propeller, the transmission comprising in series two constant velocity joints with a slide connection.

16 Claims, 3 Drawing Sheets

(56) References Cited

U.S. PATENT DOCUMENTS

2017/0096942 A1* 4/2017 Curlier .................... F01D 5/02

OTHER PUBLICATIONS

Rapport de Recherche Preliminaire / Opinion Ecrite, dated Aug. 22, 2016, issued in corresponding French Application No. 1559443, filed Oct. 5, 2015, 7 pages.

* cited by examiner ns
PROPULSION UNIT FOR AN AIRCRAFT

FIELD OF THE DISCLOSURE

Embodiments of the present invention relate to the aeronautical field and relates to a propulsion unit comprising at least two fans driven by the same gas generator. It relates more particularly to a system for transferring power between the gas generator and the fans that it drives.

BACKGROUND OF THE DISCLOSURE

The present applicant has undertaken work relating to the architecture of a propulsion unit with at least two distributed fans as described in the document US-A1-2008/0098719. The objective of this was to seek optimisation of the propulsion efficiency by means of a high by-pass ratio while keeping an acceptable ground clearance and fans of small size.

The art prior to the present application also includes U.S. Pat. Nos. 2,875,599, 4,871,130, and 1,916,442.

An outline diagram of a propulsion unit 1 is shown in FIGS. 1 and 2. A gas generator 3 comprises in a conventional fashion one or more compressors supplying air to a combustion chamber; the gases issuing from the chamber drive one or more turbines connected to the compressors and in this case a free turbine 5. The latter is rigidly connected to a power shaft 6 coaxial with the shaft of the gas generator 3. This power shaft 6 drives, by means of suitable bevel gears, two intermediate radial shafts 8 and 8' disposed in particular at right angles with respect to the axis of the gas generator. The intermediate radial shafts each drive a fan shaft 9, 9' offset from, and parallel to, the axis of the gas generator. The power is transmitted by means of first bevel gear units 2 and 2' between the shaft 6 and the radial shafts 8 and 8' and second bevel gears 4 and 4' between the radial shafts 8, 8' and the fan shafts 9 and 9'. The shafts of the fans 9 and 9' each drive a fan 10, 10' of which the axis is parallel to that of the gas generator. Such an arrangement makes it possible to achieve the objectives referred to above.

According to the prior art known to the applicant, the solution to the problem of transmission between the free turbine and the fan shafts consists in using, for each of the fans, simple bevel gears at 45°, i.e. a first set of gears with two gear wheels, one on the shaft of the free turbine and the other on the radial shaft, and a second set of bevel gears at 45° with two gear wheels connecting the radial shaft to the shaft of the fan.

This solution does not take into account the large movements that take place during operation between the fan modules and the module of the gas generator because of the thermal and mechanical loads on the assembly—there may be relative movements between the gas generator and the fan modules. Couplings between the shafts by means of flexible flanges forming flectors make it possible to reduce the level of stresses in the teeth of the gears through localised deformations in the case of angular misalignment. However, this solution remains insufficient since it is limited in amplitude and does not make it possible to effectively compensate for axial misalignments. In addition, this solution has the drawback of giving rise to high stresses in the flexible flange in the event of misalignment and these may cause problems of fatigue of the material.

SUMMARY OF THE DISCLOSURE

The object of embodiments of the present invention is to provide an integrated solution for transferring the torque from the turbine shaft to the fan modules that offers good tolerance to misalignments of all kinds. The problem also arises in the case of a turboprop engine where the axis of the propeller is offset with respect to the turbine. Offset should be understood to mean the axes are not coaxial. They may be parallel.

This object is achieved by an aircraft propulsion unit comprising a turbine, at least one propeller of which the axis is offset with respect to the axis of the turbine, and a mechanism for transmitting power between the turbine and the propeller, the transmission mechanism comprising in series two constant velocity joints with a slide connection.

The term propeller also includes a fan propeller.

The power transmission mechanism thus defined allows the transmission of the torque from the turbine to the propeller shaft while allowing both angular misalignment between the shafts by virtue of the constant velocity joints and axial movement by virtue of the slide connection.

In accordance with one embodiment, the transmission mechanism is placed between a first, proximal shaft element driven by the turbine and a second, distal shaft element driving the propeller. More particularly, the two shaft elements—the proximal and distal shaft elements—and the power transmission mechanism are aligned and disposed radially with respect to the axis of the turbine.

According to one embodiment, the two constant velocity joints are connected by a slide connection.

Advantageously, at least one of the two constant velocity joints is a Rzeppa joint. Such a joint transmits the torque between its input shaft and its output shaft while allowing an angular misalignment therebetween.

Advantageously also, at least one of the two constant velocity joints is a joint of the sliding VL type. Such a joint also transmits the torque between its input shaft and its output shaft and also allows an axial movement and an angular movement between the two shafts, input and output. Such a VL joint is known from the document U.S. Pat. No. 6,585,601.

The power transmission mechanism in one representative embodiment comprises a joint of the Rzeppa type and a joint of the sliding VL type disposed in series.

The disclosed subject matter relates more particularly to a gas generator driving a turbine, the turbine driving two fans having axes offset with respect to the axis of the turbine.

BRIEF DESCRIPTION OF THE DRAWINGS

Embodiments of the present disclosure will be better understood and other details, features and advantages thereof will emerge from reading the following description, given by way of non-limitative example and with reference to the accompanying drawings, in which.

DETAILED DESCRIPTION OF THE DISCLOSURE

Figure 1:
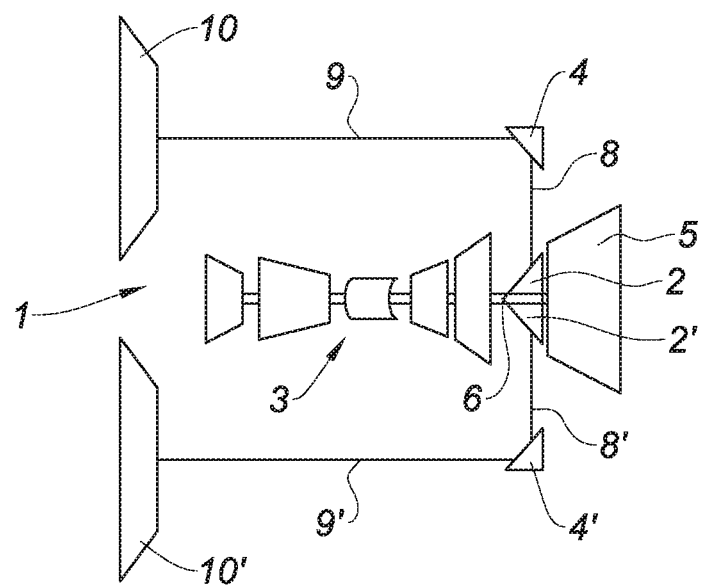
FIG. 1 is a schematic representation of an overall aircraft propulsion architecture.
Figure 2:
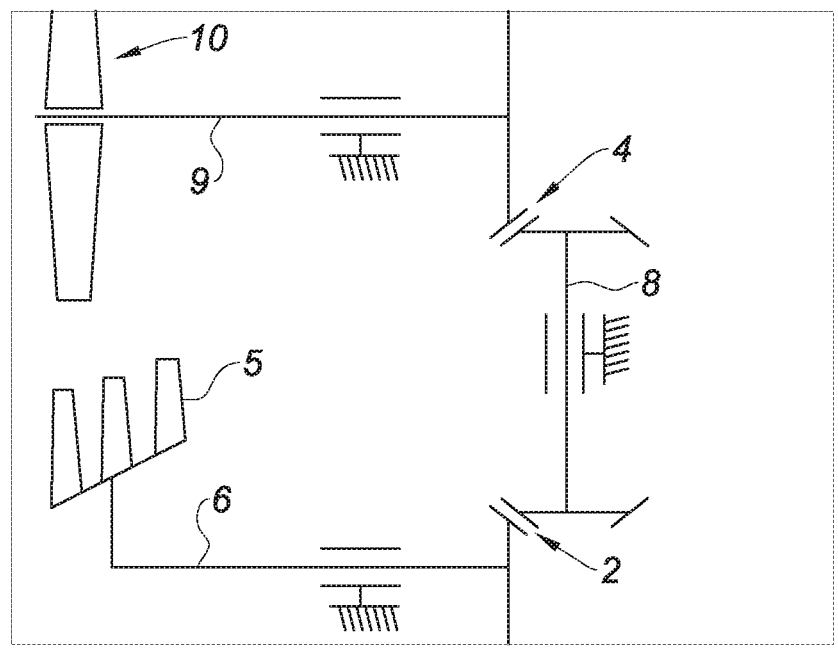
FIG. 2 shows an arrangement of the bevel gears in the driving of the shaft of a fan by the shaft of the turbine according to the architecture in FIG. 1.
Figure 3:
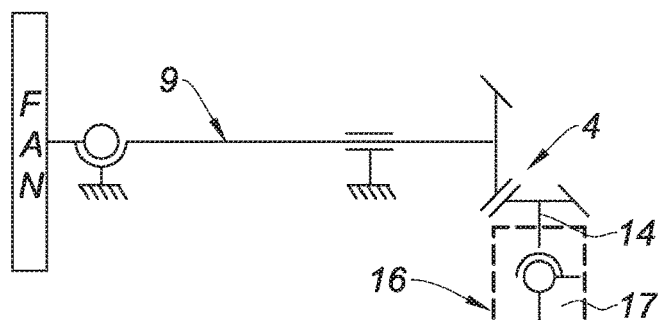
FIG. 3 shows a schematic representation of the power transmission according to one embodiment of the disclosure.
Figure 3:
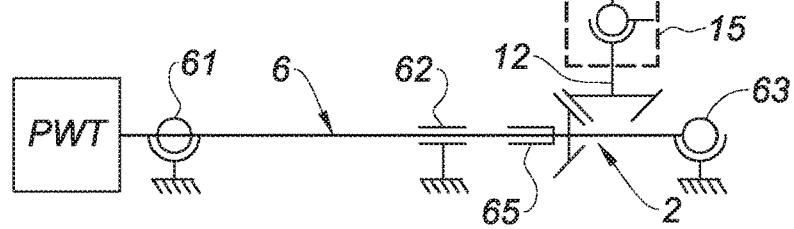

Referring to the schematic representation in FIG. 3, a propulsion unit can be seen, comprising a gas generator having a free power turbine rigidly connected to a power shaft 6 and a fan of which the axis is offset with respect to the axis of the free power turbine 5. Here, the turbine 5 with a turbine shaft line 6 is rigidly connected to a gear unit 2 with a transmission angle of 90° by means of bevel gears. A first radial shaft element 12 is driven by the gear unit 2. This first shaft element 12 is connected to a second radial shaft element 14 by means of a power transmission mechanism 16 according to an aspect of the disclosure. A second shaft element 14 is connected to a gear unit 4 with a transmission angle of 90° formed by bevel gears, which drives the offset fan shaft 9.

The first and second radial shaft elements 12 and 14 are supported by suitable support bearings, which are not shown to maintain clarity of the figure.

The power transmission mechanism 16 comprises two constant velocity joints 15 and 17 connected together by a slide connection. The mechanism 16 is arranged between the two, first and second shaft elements 12 and 14 and is shown schematically by the two constant velocity joints 15 and 17 of the universal joint type, connected by a slide connection. This combination makes it possible to compensate for the angular movements between the first and second shaft elements 12 and 14 and also axial and radial movements therebetween, which are liable to occur during the operation of the propulsion unit because of the thermal and mechanical loadings.

Figure 4:
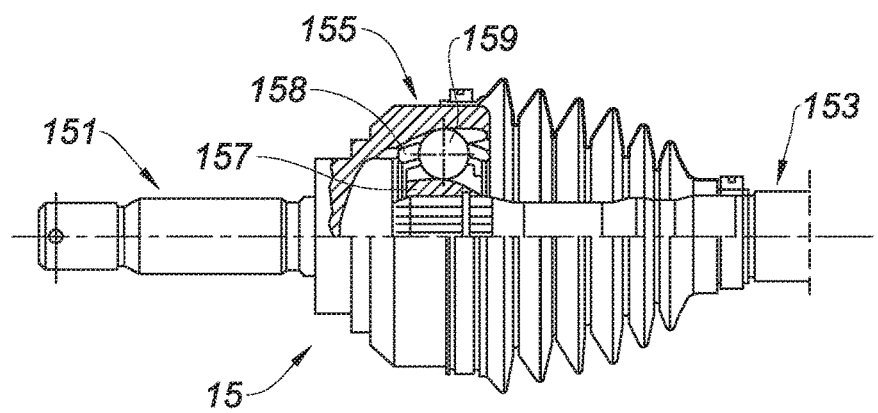
FIG. 4 is a representation in cross section of a Rzeppa joint.

Advantageously, the first constant velocity joint 15 in one embodiment is a Rzeppa joint. Such a joint is shown in FIG. 4. It comprises a driving shaft 151 and a driven shaft 153; a bowl 155 is rigidly connected to the shaft 151 and a nut 157 is rigidly connected to the shaft 153. Balls 159 held in a cage 158 are disposed between the bowl 155 and the nut 157. The arrangement between these elements is made so as to allow driving of the shaft 153 at the same rotation speed as the shaft 151 while allowing an angular misalignment therebetween.

Figure 5:
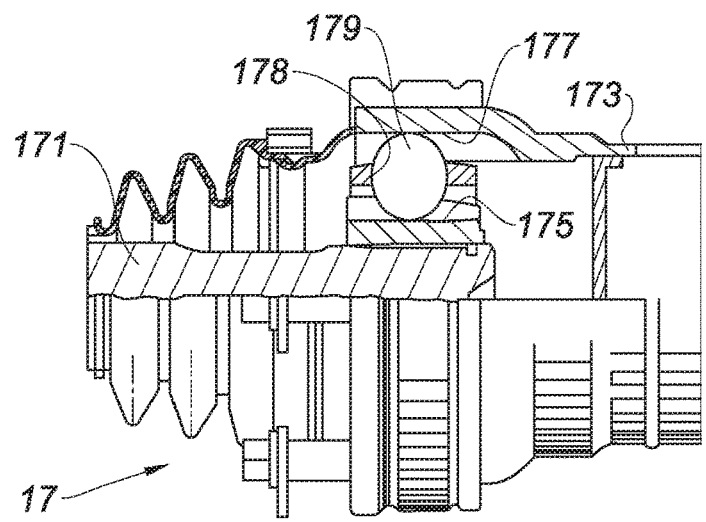
FIG. 5 is a representation in cross section of a sliding VL joint.

Advantageously also, the second constant velocity joint in one embodiment is a sliding VL joint. An example of a sliding VL joint 17 is shown in FIG. 5. It comprises a driving shaft 171 and a driven shaft 173. Balls 179 held in a cage 178 are able to move in crossing grooves 175 and 177, respectively external on the shaft 171 and internal on the shaft 173. The grooves 175, 177 allow an axial movement of the shaft 173 with respect to the shaft 171 while transmitting torque.

The second joint may also be a Rzeppa joint, the connection between the two joints then being sliding, for example by means of sliding splines. The slide connection may also be disposed on one side or other of the set of two constant velocity joints.

Figure 6:
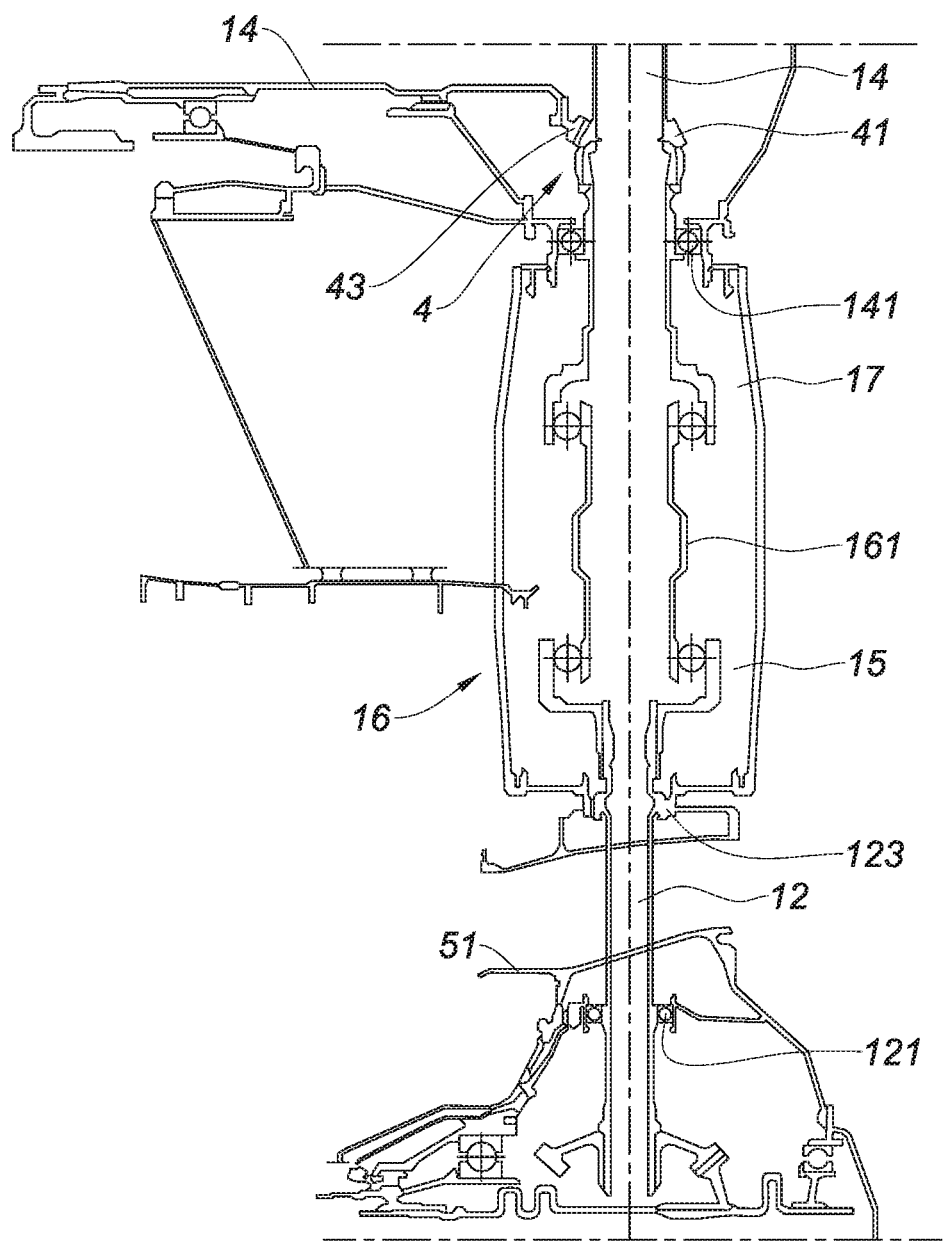
FIG. 6 shows schematically the arrangement of the shaft elements between the gas generator and the fan.

Referring to FIG. 6, an example of integrating the first and second elements of the shafts 12, 14 and the transmission mechanism 16 can be seen.

FIG. 6 shows the first shaft element 12 passing through the exhaust casing 51 of the free turbine of the gas generator. This element is supported by two radial bearings: a first ball bearing 121 on the same side as the angle gear forming an axial stop bearing along the first shaft element 12, and a second rolling bearing 123 on the same side as the transmission mechanism.

FIG. 6 also shows the second shaft element 14 on the same side as one of the fans, supported between two bearings. Only the first bearing 141 can be seen in the figure on the same side as the transmission mechanism and is formed by a ball bearing, and the second bearing, on the outside, is of the rolling bearing type. According to this embodiment, the gear unit 4 with a transmission angle of 90° is disposed between the two bearings; it comprises a gear 41 at 45° on the second shaft element 14 and a gear 43 at 45° at the end of the drive shaft 9 of the fan, not visible in the figure.

The power transmission mechanism 16 is inserted between the two, first and second radial shaft elements 12 and 14. The mechanism comprises on one side the Rzeppa constant velocity joint 15 and on the other side the sliding VL joint 17. The two joints are connected by the output shaft of one and the input shaft of the other, which form a transmission shaft 161. At this transmission mechanism, there is no need to provide support bearings. The transmission mechanism assembly 16 is contained in an oil-tight casing for the purpose of lubrication. It should be noted that the bearing 123 of the first shaft element on the gas generator side and the bearing 141 on the fan side are in this case included in the fluid-tight enclosure containing the transmission mechanism 16. The assembly is for example protected by a flange, which may be produced in two parts for assembly. The flange is cylindrical in shape and equipped with two protrusions on its upper part, these protrusions allowing mounting of nozzles that lubricate the constant velocity joints and the bearings. At the bottom point of the flange, another protrusion is produced, allowing integration of a drain system. The lubrication flange is held between the casings of the fan and gas-generator modules. The enclosure delimited by the flange is sealed by means of O-ring seals, making it possible to accommodate radial and angular misalignments between the two modules. A cylindrical surface produced on collars attached to the fan casing and the pressurisation cowl of the exhaust casing of the gas generator and on the plate allow the joints to slide and thus to compensate for axial misalignments between modules. The joint must also tolerate axial misalignments between surfaces; for example, two types of joint are disposed in series: one for compensating for axial movements between modules, and one for compensating for angular misalignments.

Referring to FIG. 3, it should be noted that the turbine shaft 6 is preferably held axially and radially by a pair of ball 61 and rolling 62 bearings; an additional bearing 63 is preferably inserted on the line downstream of the bevel gear 2 in order to compensate for the movements, under thermal and mechanical loads, of the casing in which the gear is placed and in order to minimise relative movements between the gear and the pinion of the conical gear unit. This bearing 63 is coupled to an axially sliding connection 65 and has bending flexibility of the turbine shaft 6. This can be produced on the shaft by means of bellows or by coupling two shaft halves by means of a flexible connection of the flector type.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A propulsion unit for an aircraft, the propulsion unit comprising:
   a turbine having a longitudinal axis;
   a gas generator configured to drive the turbine;
   at least one propeller of which the axis is offset with respect to the longitudinal axis of the turbine;
   a first radial shaft element extending along a radial axis and driven by the turbine;
   a second radial shaft element extending along the radial axis and driving the propeller; and
   a transmission configured to transmit power between the turbine and the propeller, wherein the transmission connects the first radial shaft element to the second radial shaft element and comprising in series only two constant velocity joints connected by a slide connection.

2. A propulsion unit for an aircraft, the propulsion unit comprising:
   a turbine having a longitudinal axis;
   a gas generator in driving relationship with the turbine;
   at least one propeller of which the axis is offset with respect to the longitudinal axis of the turbine;
   a first radial shaft element extending along a radial axis and arranged to be driven by the turbine;
   a second radial shaft element extending along the radial axis and arranged to drive the propeller; and
   a transmission configured to transmit power between the turbine and the at least one propeller, wherein the transmission connects the first radial shaft element to the second radial shaft element and comprises in series two constant velocity joints connected by a single slide connection.

3. A propulsion unit for an aircraft, the propulsion unit comprising:
   a turbine having a longitudinal axis;
   a gas generator in driving arrangement with the turbine;
   at least one propeller of which the axis is offset with respect to the longitudinal axis of the turbine;
   a first radial shaft element extending along a radial axis and arranged to be driven by the turbine;
   a second radial shaft element extending along the radial axis and arranged to drive the at least one propeller; and
   a transmission configured for transmitting power between the turbine and the at least one propeller, the transmission connecting the first radial shaft element to the second radial shaft element and comprising in series two constant velocity joints connected by a slide connection, wherein the slide connection comprises a single shaft sliding between said two constant velocity joints.

4. The propulsion unit according to claim 3, wherein the transmission is placed between the first shaft element driven by the turbine, and the second shaft element driving the propeller.

5. The propulsion unit according to claim 4, wherein the first and second shaft elements and the transmission are aligned and disposed radially with respect to a shaft of the turbine.

6. The propulsion unit according to claim 3, wherein at least one of the two constant velocity joints is a Rzeppa joint.

7. The propulsion unit according to claim 3, wherein at least one of the two constant velocity joints is a sliding VL type joint.

8. The propulsion unit according to claim 3, wherein the transmission comprises a Rzeppa joint and a sliding VL type joint disposed in series.

9. The propulsion unit according to claim 3, wherein the at least one propeller includes first and second fan propellers, and wherein the turbine is configured to drive the first and second fan propellers having axes offset with respect to a shaft of the turbine.

10. The propulsion unit according to claim 3, wherein the turbine is connected to a power shaft.

11. The propulsion unit according to claim 3, wherein the second radial shaft element is connected to a gear unit with a transmission angle of 90° formed by a first bevel gear, said first bevel gear arranged to drive the at least one propeller.

12. The propulsion unit according to claim 3, wherein the first radial shaft element is connected to a gear unit with a transmission angle of 90° formed by a second bevel gear, said second bevel gear arrange to be driven by the turbine.

13. The propulsion unit according to claim 12, wherein a bearing is inserted downstream of the second bevel gear.

14. The propulsion unit according to claim 12, wherein the at least one propeller comprises first and second propellers, and wherein the gas generator drives the first and second propellers.

15. The propulsion unit according to claim 3, wherein the transmission is contained in an oil-tight casing.

16. The propulsion unit according to claim 3, wherein a shaft of the turbine is held axially and radially by a first ball bearing and a second rolling bearing.

* * * * *